I. HALLOWAY.
Axle-Box.
No. 26,672.                                Patented Jan 3, 1860
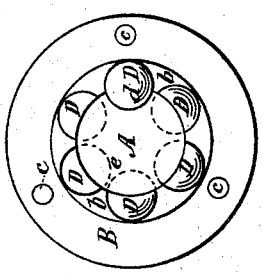
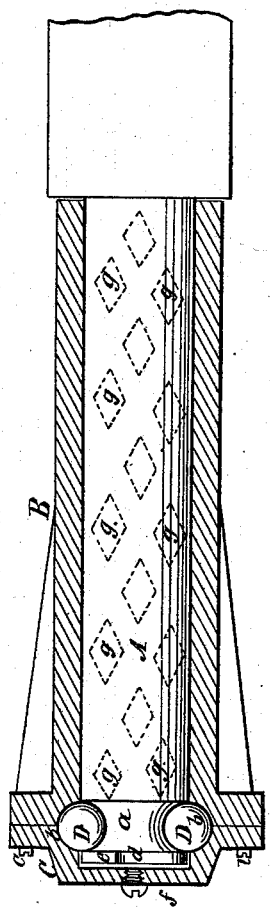
Witnesses:
Charles W. Hughes
Thos. Pettingale
Inventor:
Isaac Halloway

UNITED STATES PATENT OFFICE.

ISAAC HALLOWAY, OF NEW YORK, N. Y.

IMPROVEMENT IN AXLE-BOXES FOR VEHICLES.

Specification forming part of Letters Patent No. 26,672, dated January 3, 1860.

*To all whom it may concern:*

Be it known that I, ISAAC HALLOWAY, of the city, county, and State of New York, have invented a new and Improved Axle-Box; and I do hereby declare that the following is a full, clear, and exact description of the same, reference being had to the accompanying drawings, forming a part of this specification, in which—

Figure 1 represents a longitudinal central section of this invention, and Fig. 2 is a front view of the same with the cap removed.

Similar letters of reference indicate corresponding parts in the two figures.

In the various devices in which balls are used to reduce the friction between the axle and the sleeve it has hitherto been found difficult to chill those parts which are particularly exposed to friction, leaving at the same time the other parts soft enough to be operated on with ordinary tools. This difficulty is obviated with my axle-box, in which both the sleeve and the cap are furnished each with one-half of a semicircular groove, which admits of being chilled without affecting the other portions of said pieces, and which in combination with a similar groove in the front end of the axle serves to retain the axle in the sleeve. The balls are introduced and removed without difficulty through a recess in the front end of the axle, which, being kept on the top, does not allow any of the balls to escape even if the cap should be removed. The oil or grease is introduced through the center of the cap, so as to avoid the chilled portion of said cap in drilling the oil-hole and to retain the lubricator in the axle-box in whatever position the same may be when at rest, and at the same time the lubricating substance is divided over and retained in the interior of the sleeve by means of quadrant recesses, the whole being so arranged as to render my axle-box superior for its cheapness, its easy operation, and its economy in regard to wear and in the consumption of oil or grease.

To enable those skilled in the art to make and use my invention, I will proceed to describe it.

The axle A works in the box or sleeve B, and its front end is provided with a semicircular groove $a$, which corresponds to a similar groove $b$, one half of which is in the front end of the sleeve and the other half in the inside of the cap C, as clearly shown in Fig. 1. The cap C is secured to the sleeve by means of screws $c$, and when the cap is in its place the groove $a$ in the axle, in combination with the groove $b$ in the sleeve and in the cap, forms a circular tube to receive the balls D, which are introduced into the groove $a$ before the cap C is screwed on through a semicircular recess $d$ cut into the edge of the flange $e$ on the front end of the axle. These parts of the sleeve B and of the cap C which come in contact with the balls D are chilled, and the balls themselves may also be made of chilled cast-iron, so that those parts which have to sustain the principal part of the friction do not wear out too quick. At the same time the balls serve to retain the axle in the sleeve, and the length of the axle in regard to the sleeve is such that a longitudinal motion of the same or of the sleeve in whatever direction it may take place causes the balls to bear against one side or against the other of the groove $a\ b$, and that the entire friction arising from such motion is converted into rolling friction having little or no effect on the motion of the axle. The oil-hole $f$ is drilled into the center of the cap in the first place because this portion of the cap is not affected by the chilling of the groove $b$, and also because the lubricating substance has no chance to escape if the hole is in the center as it has when the hole is in the side of the cap and when the axle is left standing with the oil-hole down. The lubricating substance entered through the oil-hole is divided over the inner surface of the sleeve by means of quadrant recesses $g$, which may be made so as to communicate one with the other by little grooves. A small quantity of oil or grease is thus sufficient to keep the axle lubricated for a long time.

Having thus described my invention, what I claim as new, and desire to secure by Letters Patent, is—

1. An axle-box arranged with chilled cast-iron balls D to fit into a cap C, together with a groove $a$ in the axle A, an oil-hole $f$ in the center of the cap C, and quadrant recesses $g$ in the inside of the sleeve, substantially as and for the purpose specified.

2. The arrangement of the recess $d$ in the flange $e$ in the front end of the axle A, substantially as described, for the purpose of facilitating the operation of putting in and taking out the balls D.

ISAAC HALLOWAY.

Witnesses:
CHARLES M. HUGHES,
THOS. PETINGALE.